3,414,529
CURABLE ELASTOMERIC EPICHLOROHYDRIN POLYMER COMPOSITIONS AND METHOD FOR CURING SAID COMPOSITIONS
Harold A. Green, Havertown, and Elwood E. Huntzinger, Springfield, Pa., assignors to Air Products and Chemicals, Inc., Philadelphia, Pa., a corporation of Delaware
No Drawing. Filed Nov. 9, 1967, Ser. No. 681,900
5 Claims. (Cl. 260—2)

ABSTRACT OF THE DISCLOSURE

Curing or vulcanizing of elastomeric epichlorohydrin homopolymers and copolymers with curing compositions including triethylenediamine or a C-methyl triethylenediamine. The preferred compositions also include a diazaheteromonocyclic compound such as an alkyl imidazole or mercaptoimidazoline.

BACKGROUND OF THE INVENTION

There has recently been introduced a new family of specialty rubbers composed of high molecular weight homopolymers of epichlorohydrin and of copolymers of epichlorohydrin with ethylene oxide. Interest in these products has been developed because of their resistance to fluids, ozone, heat and flame. Cured vulcanizates of these epichlorohydrins offer excellent resistance to various immersion media comparable to the best known specialty rubbers, which properties coupled with their high resiliency and flexibility at low temperatures afford important advantages for use in aircraft, automotive and mechanical goods, packings, adhesives, wire and cable jackets and hose and belting.

Among the more familiar of these epichlorohydrins are the homopolymers marketed under the trade name "Hydrin 100" and the copolymers of epichlorohydrin with ethylene oxide marketed as "Hydrin 200." ("Hydrin" being a registered trademark of The B. F. Goodrich Company.)

The homopolymer is indicated to correspond to the formula

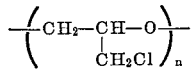

wherein $n$ has a value in the order of about 5,000 or more (molecular weight equals about 500,000) while the copolymers are indicated to correspond to the general formula

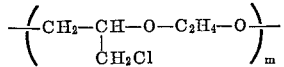

wherein $m$ has a value in the order of about 20,000 (these copolymers have a molecular weight in the order of about 2,800,000) and generally are comprised of about 68% by weight of the epichlorohydrin units and 32% by weight of the ethylene oxide units. These polymers are described more fully by W. R. Leach, Rubber World, August 1966, at pages 71 to 74 and by W. D. Willis et al., Rubber World, October 1965 at pages 88 to 97.

The copolymer has a much lower brittle point while retaining qualities characteristic of epichlorohydrin homopolymers. The hompolymer is important because of exceptional oil resistance and impermeability to gases. The copolymer has an unusually good balance of oil resistance and brittle point which combined with inherent ozone resistance renders the same especially attractive for use in numerous rubber products for the automotive and other industries.

In the processing of these elastomers the usual steps employed in other specialty synthetic elastomers, such as polyacrylics, are followed; the first step being the mastication of the polymer with fillers, processing aids, antioxidants, etc. followed by the actual cure (vulcanization) carried out in a heated form or a mold. For mixing of the epichlorohydrin elastomers the recommended procedure is to employ a Banbury mixer followed by milling on cold rolls, or in some instances mixing may be accomplished entirely on the mill with satisfactory results although somewhat slower than when the Banbury is employed.

The heretofore recommended curing agents for the epichlorohydrin elastomers are diamines with some preference being indicated for diazaheteromonocyclic compounds such as piperazine hexahydrate and 2-mercaptoimidazoline; metal oxides are generally employed as stabilizers together with black or non-black fillers and the usual pigments that have been employed in other rubbers. None of the curing systems hitherto proposed have been found fully satisfactory from the standpoint of meeting all desired qualifications including desirably high non-tempered properties (not requiring postcure), acceptably high modulus, good compression set and good aging properties as well as substantial freedom from scorch.

It has now been found that improved curing of these epichlorohydrin elastomers can be obtained by the use of systems including triethylenediamine or C-methyl triethylenediamine. These are preferably employed in combination with a diazaheteromonocyclic compound such as an alkyl imidazole or mercaptoimidazoline.

In comparisons made with 2-mercaptoimidazoline alone, the generally recommended curative for epichlorohydrin systems, it was found that by employing the same in combination with triethylenediamine or with methylated derivative thereof, non-tempered properties of the elastomer were similar to those obtainable with the control only after tempering, particularly with respect to compression set. In combinations of triethylenediamine or C-methyl triethylenediamine with alkyl imidazole, tempering is required for optimum performance but the properties of the obtained elastomer are generally superior to those of the tempered control and the compression sets are particularly outstanding.

The invention is clarified more fully by the following illustrative embodiments:

Example I

The base recipe employed in each of the runs shown in Table 1 below was as follows:

| | P.b.w. |
|---|---|
| Epichlorohydrin polymer (Hydrin 100) | 100 |
| Dibasic lead phosphite (Dyphos) | 5 |
| Polymerized trimethyl dihydroquinoline (Agerite Resin D) | 1 |
| Furnace black (FEF) | 30 |
| Zinc stearate | 1 |
| Curative | As shown |

TABLE 1

| Run | Curative | Phr. | Min. vis. | Mooney Scorch at 250° F. | | | Tensile Strength, p.s.i. | Elong., Percent | Modulus, p.s.i. | | Shore A Hardness | Compression Set (percent) Method B 22 M. at 212° F. |
|---|---|---|---|---|---|---|---|---|---|---|---|---|
| | | | | $T_5$ | $T_{30}$ | $T_{35}$ min. | | | 100% | 200% | | |
| 1 | NA-22 | 1.5 | 27 | 10.6 | 17.6 | 18.0 | [1] nt 2,045<br>[2] t 2,480 | 500<br>310 | 380<br>610 | 905<br>1,020 | 68<br>72 | 32<br>14 |
| 2 | {NA-22<br>{MTEDA | 1.5<br>0.5 | 25 | 9.4 | 13.4 | 13.8 | nt 2,295 | 310 | 645 | 1,685 | 67 | 13 |
| 3 | MTEDA | 2.0 | 30 | 26.8 | >30 | | Not tested | | | | | |
| 4 | EMI-24 | 1.5 | 21 | >30 | | | nt 2,115<br>t 2,465 | 600<br>220 | 340<br>800 | 865<br>--- | 65<br>73 | 39<br>12 |

[1] nt=not tempered (press cured 30 minutes at 310° F.).
[2] t=tempered (press cured 30 minutes at 310° F. and oven post cured 3 hrs. at 300° F.).
NA-22 is 2-mercaptoimidazoline (Du Pont).
MTEDA is 2-methyl triethylenediamine [2-methyl-1,4-diazabicyclo-(2.2.2)-octane].
EMI-24 is 2-ethyl-4-methyl imidazole.

Example II

In another series of runs employing the same base recipe as described above in Example I, the following results were obtained:

The foregoing examples indicate the advantages obtained when employing NA-22 in combination with TEDA or MTEDA in curing of the epichlorohydrin homopolymers. In general these added co-curatives appear

TABLE 2

| Run | Curative | Phr. | Min. vis. | Mooney Scorch at 310° F. | | | Tensile Strength, p.s.i. | Elong., Percent | Modulus, p.s.i. | | Shore A Hardness | Compression Set (percent) Method B 22 hr. at 212° F. |
|---|---|---|---|---|---|---|---|---|---|---|---|---|
| | | | | $T_5$ | $T_{30}$ | $T_{35}$ min. | | | 100% | 200% | | |
| 5 | NA-22 | 2.0 | 15 | 2.9 | 4.4 | 4.5 | nt 2,170<br>t 1,975 | 425<br>250 | 555<br>895 | 1,140<br>1,640 | 67<br>73 | 21<br>18 |
| 6 | {NA-22<br>{MTEDA | 1.5<br>0.5 | 16 | 3.1 | 4.2 | 4.3 | nt 2,170<br>t 2,465 | 290<br>270 | 605<br>900 | 1,685<br>2,120 | 67<br>70 | 15<br>10 |
| 7 | {NA-22<br>{TEDA | 1.5<br>0.5 | 22 | 2.8 | 3.7 | 3.8 | nt 2,250<br>t 2,250 | 250<br>225 | 870<br>1,220 | 1,925<br>2,440 | 57<br>71 | 17<br>21 |
| 8 | {EMI-24<br>{MTEDA | 1.5<br>0.5 | 16 | 6.8 | 10.9 | 11.1 | nt 2,445<br>t 2,470 | 460<br>180 | 450<br>1,320 | 1,260<br>--- | 58<br>69 | 18<br>7 |
| 9 | {EMI-24<br>{TEDA | 1.5<br>0.5 | 18 | 6.9 | 9.5 | 9.7 | nt 2,455<br>t 2,615 | 420<br>180 | 570<br>1,415 | 1,515<br>--- | 64<br>73 | 31<br>9 |
| 10 | {EMI-24<br>{TEDA<br>{Sulfur | 1.5<br>0.5<br>1.0 | 22 | 4.3 | 6.7 | 6.9 | nt 2,605<br>t 2,685 | 550<br>280 | 450<br>335 | 1,090<br>2,105 | 62<br>70 | 49<br>33 |

For footnotes 1 and 2 see Table 1.
TEDA is triethylenediamine [1,4-diazabicyclo-(2.2.2)-octane].

Example III

The base recipe employed in each of the runs of Table 3 below was as follows:

BASE RECIPE

|  | P.b.w. |
|---|---|
| "Hydrin" 200 | 100 |
| Zinc stearate | 1 |
| Red lead | 5 |
| NBC [1] | 1 |
| Furnace black (FEF) | 30 |
| Curative | As shown |

[1] NBC is nickel dibutyl dithiocarbamate.

to activate the NA-22 to the extent that tempering is not required to achieve maximum physical properties.

In use of combinations of the alkyl imidazole compound with TEDA or MTEDA for curing polyepichlorohydrin elastomers tempering is usually needed for optimum performance, but the properties of the cured polymer are generally better than those of the tempered control (mercaptoimidazoline alone). Compression sets of the elastomers cured with the alkyl imidazole combinations are particularly outstanding.

Used alone, in epichlorohydrin copolymer systems MTEDA at 1.5 phr. effected a slower cure than the control. TEDA at 2.0 phr. produced vulcanizates with better tensile strength both in tempered and non-tempered runs than the control, although non-tempered compression set

TABLE 3

| Run | Curative | Phr. | Min. vis. | Mooney Scorch at 250° F. | | | Tensile Strength, p.s.i. | Elong., Percent | Modulus, p.s.i. | | Shore A Hardness | Compression Set (percent) Method B 22 hr. at 212° F. |
|---|---|---|---|---|---|---|---|---|---|---|---|---|
| | | | | $T_5$ | $T_{30}$ | $T_{35}$ min. | | | 100% | 200% | | |
| 11 | TEDA | 1.0 | 71 | 5.5 | 9.3 | 9.7 | nt 1,340<br>t 2,110 | 850<br>550 | 140<br>250 | 285<br>695 | 59<br>62 | 48<br>21 |
| 12 | TEDA | 2.0 | 48 | 3.4 | 5.2 | 5.4 | nt 2,660<br>t 2,500 | 420<br>190 | 470<br>990 | 1,275<br>--- | 66<br>75 | 36<br>12 |
| 13 | MTEDA | 1.5 | 40 | 7.5 | 16.1 | 17.1 | nt 620<br>t 2,040 | 1,050<br>620 | 120<br>230 | 165<br>650 | 57<br>61 | 63<br>24 |
| 14 | EMI-24 | 1.0 | 27 | 13.0 | 19.7 | 20.3 | nt 1,425<br>t 2,215 | 1,070<br>700 | 145<br>250 | 215<br>610 | 57<br>65 | 56<br>13 |
| 15 | EMI-24 | 2.0 | 26 | 7.6 | 12.9 | 13.4 | nt 2,145<br>t 2,160 | 1,030<br>400 | 190<br>540 | 425<br>1,265 | 60<br>73 | 27<br>5 |
| 16 | NA-22 | 2.0 | 53 | 2.0 | 3.0 | 3.1 | nt 1,725<br>t 1,925 | 290<br>225 | 545<br>660 | 1,300<br>1,660 | 76<br>78 | 14<br>14 |
| 17 | {NA-22<br>{TEDA | 1.5<br>0.5 | 47 | 2.2 | 3.3 | 3.4 | nt 1,890<br>t 2,135 | 290<br>210 | 630<br>835 | 1,430<br>1,950 | 78<br>79 | 13<br>13 |
| 18 | {NA-22<br>{MTEDA | 1.5<br>0.5 | 48 | 2.1 | 3.2 | 3.3 | nt 2,000<br>t 2,260 | 330<br>290 | 580<br>715 | 1,340<br>1,670 | 76<br>78 | 13<br>10 |
| 19 | {EMI-24<br>{MTEDA | 1.5<br>0.5 | 41 | 7.9 | 11.9 | 12.4 | nt 2,180<br>t 2,370 | 850<br>350 | 240<br>545 | 530<br>1,390 | 69<br>74 | 23<br>15 |
| 20 | {EMI-24<br>{TEDA | 1.5<br>0.5 | 44 | 6.1 | 10.1 | 10.5 | nt 2,310<br>t 2,330 | 950<br>270 | 230<br>775 | 535<br>1,795 | 66<br>76 | 40<br>16 |
| 21 | {EMI-24<br>{TEDA | 1.0<br>1.0 | 47 | 4.4 | 8.4 | 8.8 | nt 2,350<br>t 2,465 | 710<br>280 | 330<br>775 | 725<br>1,840 | 69<br>77 | 33<br>8 | and aging resistance were not as good as that of the control, the tempered compression set was within the range regarded as very good.

In the curing of epichlorohydrin copolymer systems (Hydrin 200) the use of TEDA or MTEDA in combination with mercaptoimidazoline obtained products of improved tensile strength in both the tempered and non-tempered elastomers, as well as an improved compression set (tempered) over that obtained with the control alone. When ethyl methyl imidazole was used in combination with TEDA or MTEDA in curing the epichlorohydrin copolymers the tempered products showed an excellent balance of properties; best results being obtained with curing compositions composed of 1.0 phr. of the alkyl imidazole and 1.0 phr. of TEDA. This stock had 28% better tensile strength, 24% higher elongation and 43% lower compression set than the tempered control in addition to greater processing safety.

The amount of curative employed in the usual elastomer formulations should be in the range of 1.5 to 2.5 parts per hundred parts by weight of the epichlorohydrin polymer. In using TEDA or MTEDA as co-curing agent in combination with the diazamonocyclohetero compound, the proportion of TEDA or MTEDA may vary with the individual formulations and properties desired generally from about ⅕ to equal the quantity of the other curing compound(s).

Obviously, many modifications and variations of the invention as hereinbefore set forth may be made without departing from the spirit and scope thereof, and therefore only such limitations should be imposed as are indicated in the appended claims.

What is claimed is:

1. Curable elastomeric compositions containing as synthetic elastomer a high molecular weight polymer from the group consisting of homopolymers of epichlorohydrin and copolymers thereof with ethylene oxide, said composition comprising as curing agent therein
   (a) a diazabicyclo compound from the group consisting of triethyenediamine and C-methyl triethylenediamine and
   (b) a monocyclic diaza compound from the group consisting of mercaptoimidazoline and lower alkyl imidazole, said curing agent constituting 1.5 to 2.5 parts per hundred parts by weight of said high molecular weight polymer.

2. A process for curing elastomeric homopolymers and copolymers of epichlorohydrin which comprises heating such a polymer in the presence of a curing agent comprising a bicyclic diaza compound from the group consisting of triethylenediamine and methyl triethylenediamine together with a monocyclic diaza compound from the group consisting of mercaptoimidazoline and lower alkyl imidazole, the ratio of the bicyclic diaza compound to the monocyclic diaza compound in said curing agent being in the range of 1:1 to 1:5.

3. Compositions as defined in claim 1 wherein said curing agent contains 2-ethyl-4-methyl imidazole.

4. Compositions as defined in claim 1 wherein said curing agent contains 2-mercaptoimidazoline.

5. Compositions as defined in claim 1 wherein said curing agent consists essentially of ⅕ to 1 part by weight of said diazabicyclo compound for each part of said monocyclic diaza compound.

References Cited

UNITED STATES PATENTS 3,135,705  6/1964  Vandenberg.

WILLIAM H. SHORT, *Primary Examiner.*

T. E. PERTILLA, *Assistant Examiner.*